(12) United States Patent
Halpin

(10) Patent No.: US 7,949,589 B2
(45) Date of Patent: May 24, 2011

(54) SYSTEM AND METHOD FOR EVALUATING AND MANAGING PARTICIPATORY REAL ESTATE INVESTMENTS AND TRANSACTIONS

(75) Inventor: Richard G. Halpin, Castle Rock, CO (US)

(73) Assignee: Equity Street, LLC, Newbury Park, CA (US)

( * ) Notice: Subject to any disclaimer, the term of this patent is extended or adjusted under 35 U.S.C. 154(b) by 1442 days.

(21) Appl. No.: 11/063,386

(22) Filed: Feb. 22, 2005

(65) Prior Publication Data

US 2006/0190370 A1     Aug. 24, 2006

(51) Int. Cl.
G06Q 40/00     (2006.01)
(52) U.S. Cl. .................................. 705/36 R; 705/38
(58) Field of Classification Search ............... 705/36 R, 705/38
See application file for complete search history.

(56) References Cited

U.S. PATENT DOCUMENTS

| | | | |
|---|---|---|---|
| 5,689,650 A | 11/1997 | McClelland et al. | |
| 5,794,216 A * | 8/1998 | Brown | 705/27 |
| 6,253,191 B1 * | 6/2001 | Hoffman | 705/35 |
| 6,292,788 B1 * | 9/2001 | Roberts et al. | 705/36 T |
| 6,321,202 B1 * | 11/2001 | Raveis, Jr. | 705/1 |
| 6,345,262 B1 * | 2/2002 | Madden | 705/38 |
| 6,594,633 B1 * | 7/2003 | Broerman | 705/1 |
| 6,684,196 B1 * | 1/2004 | Mini et al. | 705/26 |
| 6,711,554 B1 * | 3/2004 | Salzmann et al. | 705/64 |
| 7,389,242 B2 * | 6/2008 | Frost | 705/1 |
| 2001/0039508 A1 | 11/2001 | Nagler et al. | |
| 2001/0047282 A1 * | 11/2001 | Raveis, Jr. | 705/7 |
| 2002/0010674 A1 | 1/2002 | Kent | |
| 2002/0035520 A1 * | 3/2002 | Weiss | 705/27 |
| 2002/0049624 A1 * | 4/2002 | Raveis, Jr. | 705/8 |
| 2002/0077893 A1 * | 6/2002 | Wolf et al. | 705/14 |
| 2002/0128963 A1 * | 9/2002 | Madden | 705/38 |
| 2003/0093371 A1 * | 5/2003 | Wilson | 705/40 |
| 2003/0187756 A1 * | 10/2003 | Klivington et al. | 705/27 |

(Continued)

OTHER PUBLICATIONS

"Equity Street"—www.equitystreet.com website [online]. Equity Street, May 26, 2002 [retrieved on May 20, 2010]. Retrieved from the internet: <URL: http://web.archive.org/web/*/http://www.equitystreet.com>, and <URL: http://web.archive.org/web/20020526101921/http://www.equitystreet.com/>.*

*Primary Examiner* — James A Kramer
*Assistant Examiner* — Hao Fu
(74) *Attorney, Agent, or Firm* — Lee G. Meyer, Esq.; Meyer & Associates, LLC

(57) ABSTRACT

An automated System and method for evaluating real estate Candidate Transactions for participatory funding by Investment Criteria based Managed Investment Funds; and, then managing the funded Candidate Transactions from purchase and/or construction to completion and/or sale. Complex, secured, real estate based participatory funding transactions, are evaluated, funded and transacted from initiation to completion, by utilization of a method employing an automated system to effectively evaluate the advisability of investing in evaluated and ranked Candidate Transactions which meet Investor Criteria. A system administrator sets system policy for a system transaction manager to move content and protocol to/from indexed users over a communication link to evaluate candidate transactions from real estate investors, fund accepted candidate transactions, oversee improvements, and execute exit strategies. Accepted Candidate transactions are funded and moved in a seamless interface by an automated systems manager that employs vendors, interfaces with consultants and directs all aspects of a real estate based transaction from funding through completion.

14 Claims, 3 Drawing Sheets

U.S. PATENT DOCUMENTS

| | | |
|---|---|---|
| 2003/0200102 A1 | 10/2003 | Tao |
| 2003/0225665 A1 | 12/2003 | Gross et al. |
| 2004/0153388 A1 | 8/2004 | Fisher et al. |
| 2004/0225585 A1* | 11/2004 | Hoffman .......................... 705/35 |
| 2005/0015335 A1 | 1/2005 | Howard |
| 2006/0161472 A1* | 7/2006 | Weild, IV ....................... 705/10 |
| 2008/0189204 A1* | 8/2008 | Hansford ........................ 705/38 |

* cited by examiner

SYSTEM AND METHOD FOR EVALUATING AND MANAGING PARTICIPATORY REAL ESTATE INVESTMENTS AND TRANSACTIONS

BACKGROUND OF THE INVENTION

1. Field of the Invention

The present invention relates generally to a system and method for evaluating and managing participatory investments in real estate transactions; and, more particularly, to an automated system and method for evaluating real estate Candidate Transactions for participatory funding by Investment Criteria based Managed Investment Funds and then managing the funded Candidate Transactions from purchase and/or construction to completion and/or sale.

2. Description of Related Art

Real estate has long been an investment vehicle for various entrepreneurs, managed funds, and the like. Because of the rather large sums involved, one drawback has been the requirement to borrow or otherwise procure third party investment funds to consummate the transaction. Conventional real estate transactions have traditionally involved a mortgage company that lends funds to a purchaser who can be the occupant of the property or an investor or lessor in commercial transactions. Conventional lending practices are highly regulated, and in the case of residential properties have taken on a transactional form which requires a high degree of rigidity, paper work, and governmental compliance when funding conventional real estate transactions.

Another type of real estate investment, however, involves true equity participation with the purchaser/builder/developer for the purpose of purchasing and reselling, or leasing the repositioned residential, industrial, or commercial property. These purchase and/or construction and re-sale and/or lease investments almost always require third party financing and take on a number of different forms.

In one highly touted investment scheme dilapidated or "slum" properties are purchased by a legal entity, such as a corporation or a limited liability company, an investor, or an investment group or association; and, upgraded (or in some cases raised) and/or re-constructed to be subsequently re-sold at an elevated sales price. This type of investment upgrades and repositions the property to give the investor/purchaser a value added re-sale. In accordance with some of these transactions, various favorable tax treatments are afforded the investor to enhance the return on the investment.

In another scheme, a portion of the purchase price of an existing edifice is donated to a not-for-profit organization, which not-for-profit organization then funds the upgrade or rehab, and the investor then re-sells the upgraded property while receiving a tax deduction for the donation. Various other schemes take advantage of favorable tax treatment, for example, historical buildings, and the like. Low income housing refurbishment and construction can also involve local state or federal government subsidy or participation.

There is, however, another investment scheme colloquially referred to as "flipping" real estate. In accordance with this transaction, Real Estate Investors, who are self-funded or able to borrow money to purchase Investment Properties, reposition these properties in the market by, for example, refurbishing or upgrading the property and re-selling the property for a profit. These transactions have become more popular with a segment of the real estate community familiar with a particular market, demographics, and the like. The major drawback to a Real Estate Investor in this practice is availability of conventional funds, and the drawback to a participatory capital provider is the substantial amount of effort required in purchasing, upgrading, and tracking all the transactional requirements through re-sale.

Because of the economy of scale associated with investing in small to medium sized residential or commercial real estate transactions in a local or regional real estate market, is so locally regulated and peculiar to a specific area or locale, it is heretofore been virtually impossible to efficiently invest institutionally or large scale managed funds in these real estate investments in any magnitude. This market has, therefore, been relegated to smaller local Real Estate Investors and third party money investment funds familiar with a specific real estate market who may work on a smaller economy of scale.

Real Estate Investors seeking financing for their investments can utilize mortgage brokers to connect them with a funding source. Mortgage Brokers, are primarily in the business of finding third party funds to support more traditional real estate transactions including "flipping," commercial development, or re-sales. These Mortgage Brokers are well familiar with the real estate market in a particular locale and deal with a cadre of Real Estate Investors active in the local market who participate, not only in the value-added real estate market, but in the Greenfield residential, industrial and commercial projects of builders and developers.

Even though, Mortgage Brokers are able to deal effectively with a cadre of Real Estate Investors, the traunch of funds available for these types of investments is still limited. There are two reasons for this lack of funding sources. The first involves the risk associated with the nuances of complicated real estate transactions, and especially those which require upgrading or rehabilitation using Contractors. The second is risk associated with lack of familiarity with the market space and inability to evaluate and rank favorable investments, especially against private Managed Investment Fund Investor Criteria.

Because of the favorable nature of investing in real estate, including the security of the transaction, i.e. liens; and, very favorable return on investment, many funds and institutional investor funds have been attracted to this market. One scheme, which avoids the regulation of the traditional mortgage company, is a "participation" investment. Like a venture between a Real Estate Investor and the money source, in this scheme the money provider actually becomes a participant with the Real Estate Investor in the transaction and shares in the profits from the deal upon completion, either by sale or in some cases real estate leases. This is somewhat akin to a venture capital arrangement, and differs from traditional mortgage lending in that the money can be provided interest free and the return on the investment is not predicated on a interest over a lending term, but rather on an agreed upon shared profits generated from the transaction. This profit can be from sale or deriving income thru the lease of the property. Thus, the Real Estate Investor, who is local, brings an investment opportunity to the fund, and the fund or third party money investment source evaluates the transaction and makes a secured investment in the real property transaction.

The drawback to this scheme is twofold. First, most investment funds do not have an automated way of evaluating the strengths and weaknesses of a real estate based deal in a particular business sector or geographic locale against another sector or geographic local. Second, and more importantly, shepherding and tracking this type of real estate based transaction or "deal" through the various phases and safeguards has heretofore been very expensive and labor intensive, not to mention very locally specific, especially when dealing with hundreds or thousands of transactions across many sectors and geographic locales.

Thus, it would be advantageous to have a System and method for providing funds to third parties, secured by the Investment Property, who wish to invest in "participation" funding for real estate based deals, on a nation-wide basis, which is efficient, effective, and inexpensive, yet provides a mechanism for consolidating a market along with evaluating and ranking literally thousands of available real estate based deals; and, then, when a chosen deal is funded, shepherding the transaction, including the safeguards for the transaction through a seamless automated System to an exit strategy.

SUMMARY OF THE INVENTION

It has now been discovered that complex, secured, real estate based, participatory funding transactions, can be evaluated, funded and transacted from initiation to completion, simply and efficiently by utilization of the automated system and method of the instant invention. According to the invention, an automated method and system to effectively evaluate the advisability of investing in evaluated and ranked Candidate Transactions which meet Investor Criteria, as well as providing a seamless interface with all the various aspects and players required to effectively and securely carry out a real estate based transaction from funding through completion is provided.

The System can be used for participation in real estate based rehab or refurbishment real estate repositioning transactions with subsequent value-added re-sale, as well as for large scale, new, real estate based residential, commercial, and industrial developments such as malls, residential developments, office complexes, apartment complexes, warehouses, manufacturing facilities, and the like. The System allows an Investment Fund Manager to evaluate the Candidate Transaction against Investment Criteria, receive security in the Investment Property including improvements, participate in the profit realized from the Candidate Transaction with an agreed upon exit strategy, while remotely following each step of the transaction from acquisition of the Investment Property to completion.

In accordance with the invention, the automated evaluation process involves both ranking against like situated Candidate Transactions, as well as against local demographics. The present invention contemplates analyzing a given Candidate Transaction and providing data concerning financial aspects of such a transaction against Investor Criteria, and ranking a given Candidate Transaction against other Candidate Transactions, as well as against real estate based local criteria and economic demographics.

In another aspect, pooling of investment funds is allowed for pooled participation in Participatory Real Estate Transactions which involve large capital requirements or multiple phases, such as a tract home development, shopping malls, and the like. In another aspect, an Investment Fund Manager can solicit conventional lending avenues, such as lines of credit to increase Managed Investment Fund capital. Advantageously, the System is web-interfaced to control both the informational and transactional aspects of a funded Candidate Transaction. The System comprises a Central Database on, for example, a client server System or a web-based System, which is populated by an Investment Fund Applicant with controlled access by Investment Fund Managers, and Indexed Users, including System Network Consultants and System Network Vendors. The Real Estate Investor is granted an access code by an initial screener, such as a Mortgage Broker, and becomes an Investment Fund Applicant with a System client ID. The Investment Fund Applicant can then submit Candidate Transactions for funding consideration by populating an application which includes the type of Investment Property, the assessed value, the proposed improvement or construction and cost, and, finally, the finances sought and the Managed Investment Fund participation. The specific Candidate Transaction can only be submitted if the Minimum Prescreen System Criteria are met.

If the Minimum Prescreen System Criteria for a Candidate Transaction are met, then that prescreened Candidate Transaction is submitted and receives a Candidate Transaction ID in the System which governs all evaluation and transaction information for the individual Candidate Transaction in the Central Database. In this way, a particular "property deal" is assigned both a "customer ID" and a "transaction ID" to make the property deal unique in the System Information Database. The Transaction Manager, following the Policy Rules as set by the System Administrator, is able to manipulate this uniquely identified Candidate Transaction through the System. In one aspect, only Real Estate Investors having commission contracts with a Mortgage Brokers who prescreen the Real Estate Investors can become an Investment Fund Applicant and submit Candidate Transactions for Investment Fund Manager's evaluation and funding.

After submittal, all of the Candidate Transactions are ranked or manipulated by the System Transaction Manager against certain preset System's evaluation criteria such as return on investment, as set forth in the Network Policy by the System Administrator, so that Investment Fund Managers can see the properties "ranked" against specific criteria. In addition, the System Transaction Manager can apply previously stored Managed Investment Fund Investor Criteria to the population of submitted Candidate Transactions to cull them on this basis as well. In another aspect, demographics on a county-by-county basis contained in a Demographic Information Overlay are overlaid on a submitted Candidate Transaction to determine the market for Candidate Transaction within the locale, giving the Investment Fund Manager further criteria against which to evaluate the Candidate Transaction.

In this manner, the Investment Fund Manager can, not only directly see the ranked quality of the Candidate Transaction so that only those that meet the Investor Criteria are considered, but has complete control of the entire transaction from inception through completion via, for example, a web-based, software System. There are other embodiments, aspects and nuances of real estate transactions which can be accomplished as well by interface with the System. One particularly advantageous aspect is that the Investment Fund Manager has total access to all information on the System, but particular consultants, clients, Contractors, investors in the fund have access controlled by the System Administrator through a series of identifying codes, Indexes, and passwords.

Thus, a Fund Investor can keep track of the Candidate Transactions in which his funds money has been invested and receive information about the progress of Candidate Transaction by simply logging on to the System. The fund Investor can only access the Candidate Transactions that he has invested in. Contractors only have access to those properties upon which they are performing contracted work. Likewise, Real Estate Investors only have access to those Candidate Transactions which they have submitted. In one embodiment, the Real Estate Investor has no personal risk, since the funds invested in the Candidate Transaction are secured solely by a lien on the property and/or insurance.

In the broad aspect, the System comprises a System Administrator controlling a System Transaction Manager, at least one Managed Fund, at least one Real Estate Investor, at least one System Network Vendor, and at least one System Network Consultant. The System Administrator enters into a relationship with at least one Managed Fund, who is indirectly responsible for funding Candidate Transactions, at least one System Network Vendor responsible for providing real estate based services for the Candidate Transactions as they move through the System; and, at least one System Network Consultant responsible for overseeing, evaluating, and approving certain aspects of the transaction as it moves through the System. The System Administrator enters into a relationship with System Network Consultants and System Network Vendors. Thus, the System Administrator contracts with System Network Consultants who agree to charge negotiated rates and participate in transactional aspects of the funded Candidate Transaction.

The method of the instant invention comprises the steps of: (1) receiving an application from a Real Estate Investor for a Candidate Transaction against a specific Investment Property to be funded; (2) evaluating the Candidate Transaction for funding eligibility; (3) funding the Candidate Transaction against the transaction criteria and taking security in the property; (4) applying the Network Rules associated with the network to the Candidate Transaction to affect the Candidate Transaction by employing System Network Vendors; (5) reviewing and approving the transactions within the Candidate Transaction by System Network Consultants; (6) processing payment for the System Network Vendors; and, completing the Candidate Transaction to affect participation.

BRIEF DESCRIPTION OF THE DRAWINGS

The features and advantages of the present invention will become more apparent from the detailed description set forth below when taken in conjunction with the drawings in which like reference numbers indicate identical or functionally similar elements. These drawings form part of the present specification and are included, without limitation, to further demonstrate certain embodiments. These embodiments may be better understood by reference to one or more of these drawings in combination with the detailed description of specific embodiments presented herein.

SYSTEM NOMENCLATURE AND DEFINITIONS

Figure 1:
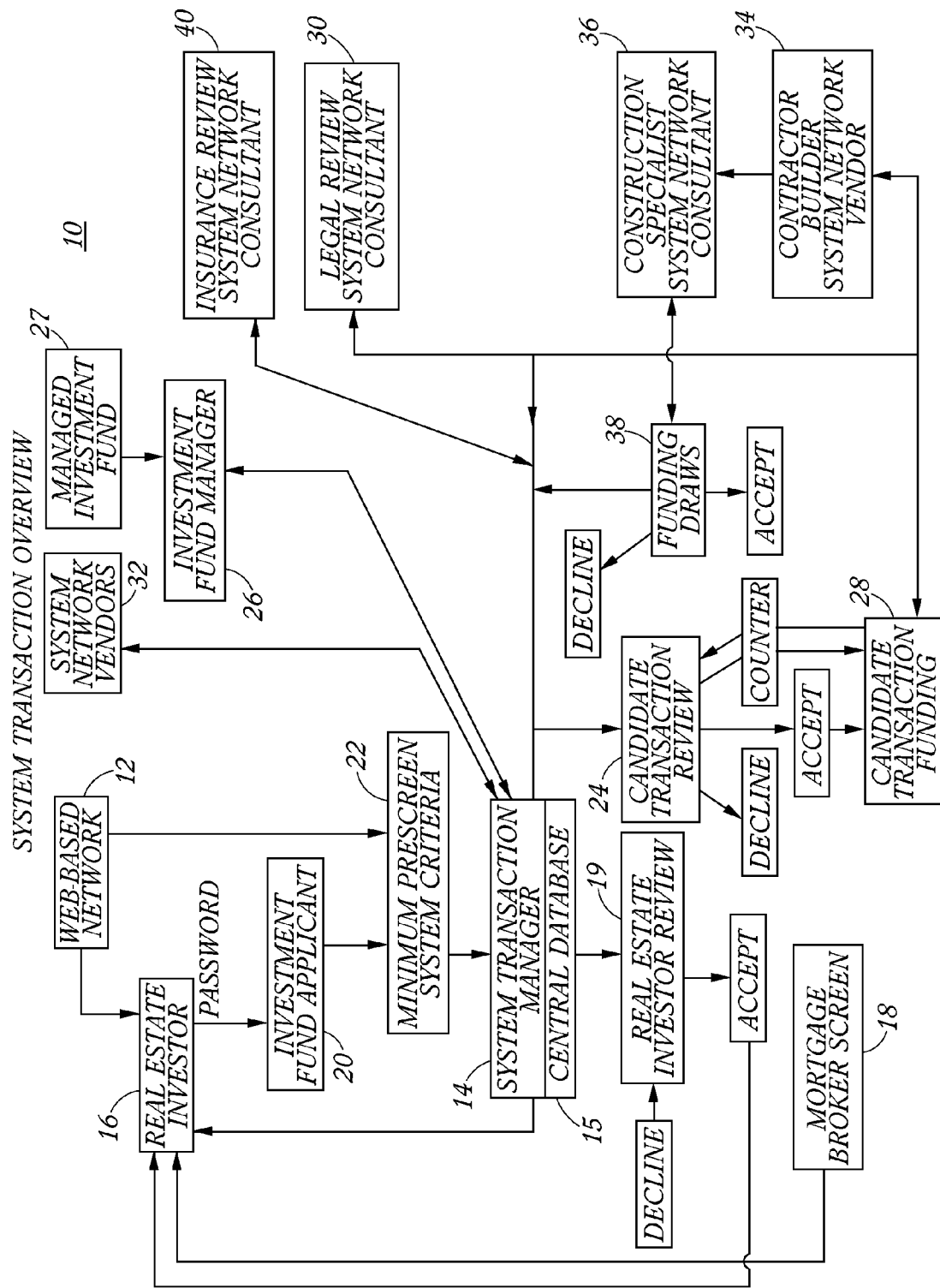
FIG. 1 is an overview of certain transaction elements of the System of the instant invention.

As used herein, the following terms will have the meanings hereinafter set forth. Alternative definitions for the listed terms will be apparent to the persons skilled in the relevant art(s) based on the discussion contained herein, and fall within the scope and spirit of embodiments of the invention.

Candidate Transaction shall mean a Participatory Real Estate Transaction submitted by an Investment Fund Applicant. Construction Specialist shall mean a System Network Consultant that reviews Contractor's bids on behalf of the Fund Manager to assure code compliance, reasonableness, and the like. Contractor shall mean an entity in privity with the Real Estate Investor that bids on the construction, rehab, refurbishment, or upgrade of an Investment Property. Demographic Information Overlay shall mean a database of specific demographic information about, for example, each of the 3000+ counties in the United States which can be overlaid on Investment Property information by correlation to give rankings to Participatory Real Estate Transactions. Fund Appraisal Consultant shall mean an entity that reviews Participatory Real Estate Transaction appraisals to determine reasonableness, accuracy, and the like. Fund Investor shall mean an entity, whether an institution or individual, which funds a Managed Investment Fund by equity capital contribution or a capital contribution through a line of credit. Index shall mean a unique User identifier which is used as a gateway for the System Transaction Manager to allow Central Database access to specific information related to a specific Candidate Transaction. Investment Fund Applicant shall mean a Real Estate Investor, who has been pre-screened and approved, (received a password) to submit Candidate Transactions through the System for evaluation and consideration by Fund Managers. Investment Fund Manager shall mean an individual or entity which manages a Managed Investment Fund. Investment Property shall mean the real estate upon which the Participatory Real Estate Transaction is based. Investor Criteria shall mean those investment criteria imposed upon a Managed Investment Fund by Fund Investors. Managed Investment Fund shall mean a pool of funds from Fund Investors for investment in a Participatory Real Estate Transaction, which may have one or more Investor Criteria and is managed by an Investment Funds Manager. Minimum Prescreen System Criteria shall mean shall mean the System minimal for prescreening a Candidate Transaction at the time of submission by the Investment Fund Applicant.

Mortgage Broker shall mean an entity that works on commission that solicits Real Estate Investors for screening to become an Investment Fund Applicant. Participatory Real Estate Transaction shall mean a real estate based funding opportunity wherein the funds provider participates in the Candidate Transaction and receives a designated portion of the profits or other interest in the Candidate's Transaction upon completion of the transaction or project. Real Estate Investor shall mean a purchaser, builder, and/or developer, whether an individual a legal entity or an association. System Administrator shall mean an entity which designates customer identifiers, passwords, Participatory Real Estate Transaction identifiers, updates the demographic information, controls the System Transaction Manager and services the System. System Network Consultant shall mean a User that may be a third party, who provides professional evaluation, screening, and approval of information related to the Candidate Transaction supplied through the System by Contactors and System Network Vendors. System Network Vendor shall mean a third party User that provides professional services related to the funded Candidate Transaction. Title/Escrow Entity shall mean a duly licensed entity able to provide title insurance and/or escrow closing services for the Participatory Real Estate Transaction.

An Index is a unique ID given a User as a System identifier, which is used to uniquely identify a particular User within the System. The Index is the primary means by which the System Transaction Manager keeps track of the protocol and information within the System. A User maintains the majority of the information for a Candidate Application, and receives updates of both content and protocol from the System Transaction Manager as the Participatory Real Estate Transaction moves through the System. A Request is a query or a transaction, by a User sent to the System Transaction Manager for handling or Response. A Response is a reply to a Request by a User. A Requester is a User that makes a Request for some services, validation, evaluation certification or information through the System Transaction Manager. Pre-existing Public Communication System is a communication link which is accessible to the Users and which can support the electronic transmission of data, including, for example, the Internet. Central Information Database is an Indexed content data repository. Central Protocol Database is an Indexed protocol repository that contains the Network Policy. Network Policy shall mean that set of criteria set by the System Administrator upon which the Network Rules are predicated. Network Rules shall mean a set of System parameter set by the System Administrator under which the System Transaction Manager operates to parse data and protocol to Indexed Users. The Central Information Database and the Central Protocol Database comprise the Central Database. The System Administrator sets the Network Policy and tests the System Network Consultant and System Network Vendors information for content compatibility, and determines priority and Index designation for the System Transaction Manager.

DETAILED DESCRIPTION OF THE INVENTION

In accordance with the invention, qualifying Real Estate Investors as Investment Fund Applicants submit their Candidate Transactions that meet Minimum Prescreen System Criteria as a Participatory Real Estate Transaction for funding by participating Managed Investment Funds using equity or mezzanine debt funding needed to complete new developments or reposition existing Investment Property such as industrial, commercial and residential projects, ranging from single-family homes to office, retail, multi-family and mixed-use projects.

The Real Estate Investors becomes the sponsor for the Candidate Transactions from initiation to completion. The Managed Investment Funds through the Investment Funds Manager becomes a participant and provides capital with the System providing strategic support as a participatory, secured investor in each funded Candidate Transactions. The System through the implementation of detailed operating and exit strategies helps provide an investment return consistent with the goals and risk profile set forth in the initial Candidate Transaction application as will be further described below.

Thus, privately held investment capital provides capital to purchase Investment Property for value added real estate opportunities and to builders and developers as an equity investment in developing the Investment Property. These capital providers are able to capitalize on investments meeting their internal yield criteria. By utilizing the System evaluation and the System transaction support, Investment Fund Managers are able to participate in secure, real estate based transactions and close transactions that conventional lending institutions are unable to consider providing their Fund Investors returns that are inline with their internal requirements. Because the Managed Investment Funds are secured participants in the Candidate Transactions and are not functioning as a lender, the return to the Managed Investment Fund is predicated upon the business success of the Candidate Transaction. Thus, Managed Investment Funds provide, through use of the instant inventive method and System, investment capital for a variety of value-added property types and developments including single family homes, multifamily, timeshare, retail and commercial edifices, and the like.

In accordance with the invention, a method for providing Investment Fund Managers structured evaluation and control of funded Candidate Transactions is provided through an automated System via a communications link using, for example, an ASP (Application Service Provider) administered by the System Administrator. The communication links can be dial-up networking, Digital Subscriber Lines, Asymmetric Digital Subscriber Lines, Virtual Private Network, LAN, WAN, cable, IR, radio frequency, cell, Internet, Intranet, and/or satellites.

The System Administrator determines eligibility and compliance as well as maintaining protocol of the Central Database to retain Indexed transactions. Internet Protocol is the communications protocol used on the Internet. In addition, TCP/IP has become the de facto communications protocol in most user networks. The eXtended Markup Language (XML) is a self-defining data stream that allows embedding of data and descriptions using tags. In addition, the language provides a number of formatting capabilities.

In an advantageous embodiment, the System prompts an Investment Fund Applicant to enter Investment Property related data in a Candidate Transaction application by populating the application with data. Property data includes type of transaction, sale price, property taxes, hazard insurance, location, assessed value of the property, and the like. The System also prompts an Investment Fund Applicant to enter financial data related to the Participatory Real Estate Transaction including financed amount, percentage of participation, construction costs, final value of the Investment Property and the like. From the property data, the financial data, and other information that may be obtained from a database or entered into the System manually, the System will evaluate the Candidate Transaction against the Minimum Prescreen System Criteria. If the Candidate Transaction fails, the System prompts an Investment Fund Applicant to modify the data, or it is declined.

Significantly, the present invention allows property data, financial data and other information to be input a single time, and then revised as needed, so that different funding options or different payment amounts or different participation levels can be evaluated and such that the funding of different Candidate Transactions can be compared. Several different scenarios can be easily calculated to help Investment Fund Managers maximize their benefit from a given transaction in a minimum amount of time. In this manner, counteroffers using the original Candidate Transaction with version authoring can be generated and presented to and from the Investment Fund Applicant.

Thus, in accordance with the invention, there is provided an evaluation portion of the System and a transaction portion of the System as better shown in the drawings. Turning to FIG. 1, there is shown a schema of the System transaction overview. The System 10 is, for example, enabled through a web-based network 12 which enables remote connection by use of password to all transaction elements in the System 10, to the System Transaction Manager 14, and Central Database 15. A Real Estate Investor 16 that has been prescreened by a Mortgage Broker 18 or System Real Estate Investor Review 19, if accepted, receives a password and is allowed access to the System 10 as an Investment Fund Applicant 20. The Investment Fund Applicant 20 is a Real Estate Investor who is approved to submit Candidate Transactions through the System 10 for evaluation and consideration for funding. A Candidate Transaction, in order to be submitted, must pass a Minimum Prescreen System Criteria 22 to enter the remainder of System 10 for review. Once the Candidate Transaction passes the Minimum Prescreen System Criteria 22, it is given an identifier and passed to Candidate Transaction review 24. At this point, Investment Fund Manager 26 representing Managed Investment Fund 27 reviews the Candidate Transaction against Investment Criteria as well as System 10 evaluation criteria (not shown). The Candidate Transaction review 24 can result in decline, acceptance, or counteroffer, as more fully set forth in detail below. If the Candidate Transaction is declined, no further consideration is given, and the System Transaction Manager 14 archives the Candidate Transaction in the Central Database 15.

If the Candidate Transaction review 24 results in acceptance or the counteroffer exchange results in an acceptance, it is preliminary accepted for Candidate Transaction funding 28. At this juncture, legal review System Network Consultant 30 generates a funding contract, which is sent to the Real Estate Investor by way of System Transaction Manager 14 for acceptance. Real Estate Investor 16 can accept, decline, or counter as previously described with the Candidate Transaction review 24 (not shown). If declined, the Candidate Transaction is archived by System Transaction Manager 14 in Central Database 15. If accepted, then System Transaction Manager 14 contacts Title Escrow Entity which is a System Network Vendor 32 to open Investment Property purchase Escrow.

During escrow further validation of the property is conducted and the Title Escrow Entity runs the requisite title search forwarding the documentation to legal review System Network Consultant 30 via System Transaction Manager 14. If approved, the Investment Property escrow is closed and Candidate Transaction funding 28 causes invested funds to be transferred via System Transaction Manager 14 to purchase Investment Property associated with the Candidate Transaction. At the closing of escrow, a security interest in the Investment Property in the name of the Management Investment Fund funding the Candidate Transaction is issued securing the funds used to purchase the Investment Property.

The Real Estate Investor 16 contracts directly with Contractor/Builder System Network Vendor 34 to commence construction and/or improvement of the Investment Property purchased. The contract is reviewed by Construction Specialist 36 and approved and/or sent back to Contractor/Builder System Network Vendor 34 for clarification or modification. Construction Specialist 36 approves budgets, draw requests, and change orders received from Contractor/Builder System Network Vendor 34 as well as generating lien releases and other documents for signature upon construction completion. Construction Specialist 36 approval is sent to funding draws 38 which pays Contractor/Builder System Network Vendor 34 directly. In this manner, funds are paid directly to Contractor/Builder System Network Vendor 34 and other System Network Vendors 32 against a Candidate Transaction account, all of which is accomplished through System Transaction Manager 14 as will be further described below.

System Network Vendors 32 comprise appraisals, escrow agents, title agents, engineering inspection companies, and the like, and, depending upon the nature of the Candidate Transaction being funded, are interfaced appropriately by System Transaction Manager 14 and paid through funding draws 38. Insurance review (Insurance compliance) System Network Consultant 40 is interfaced by System Transaction Manager 14 to affect risk management for the Candidate Transaction as it progresses to completion. In accordance with this aspect, Insurance review System Network Consultant 40 causes System Transaction Manager 14 to purchase appropriate builder's risk and other insurance necessary to protect the investment in the Candidate Transaction by the Managed Investment Fund 27. In this manner, the Managed Investment Fund 27 is protected by not only a security interest in the property, but appropriate insurance coverage which is charged back to the Candidate Transaction account and paid directly through funding draws 38.

Within Candidate Transaction, various transactions carried out by the System Transaction Manager 14 are monitored such that the status of account activities is triggered to indicate, for example, assignment of Contractors to Candidate Transaction jobs, draws, change orders, and interface with Contractors/Builders System Network Vendor 34 is accomplished.

Figure 2:
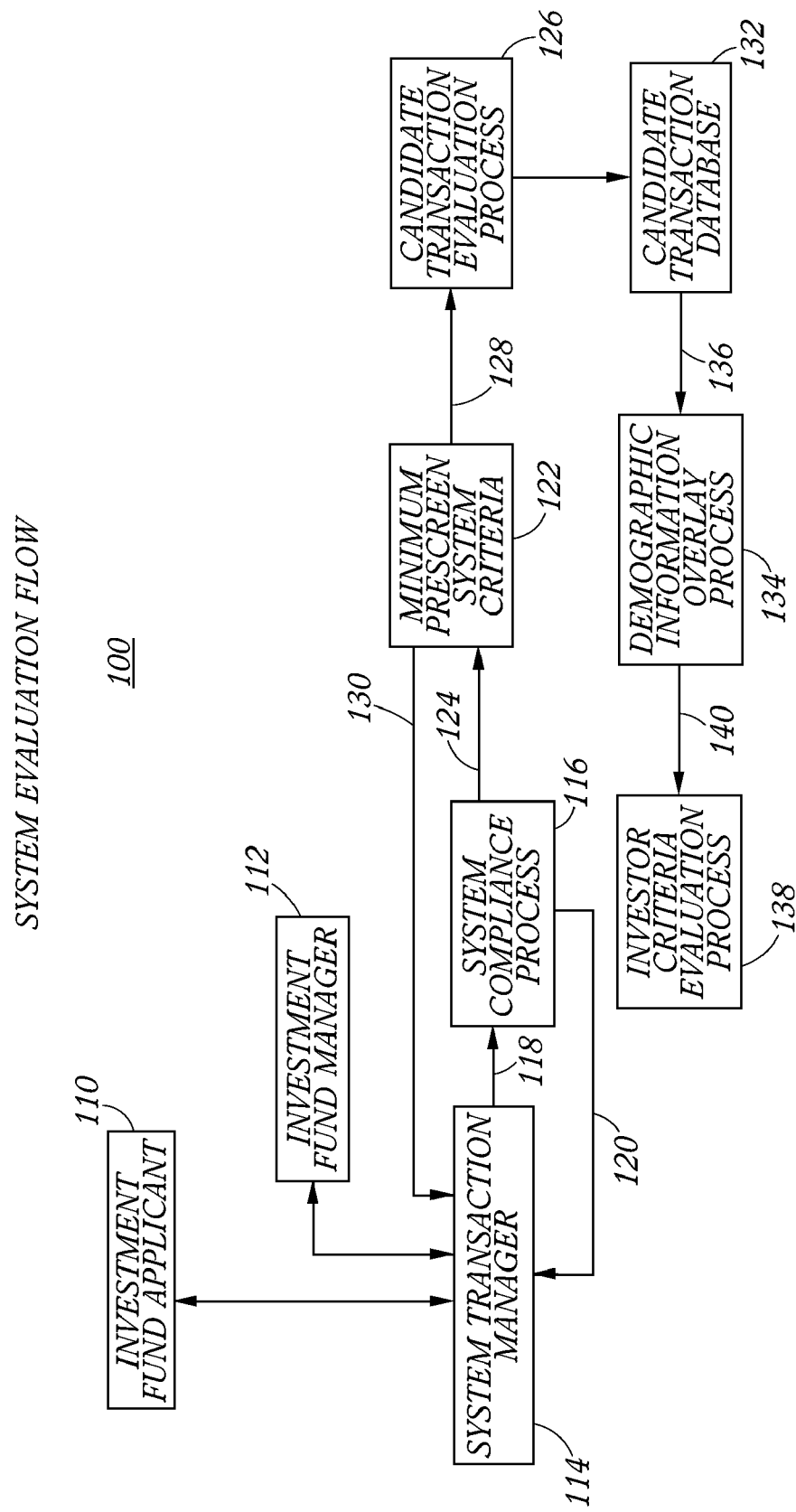
FIG. 2 is a functional flow of the elements of the System evaluation portion of the instant invention.

Turning to FIG. 2, there is shown a System evaluation flow 100. In accordance with the invention, one aspect of the System is to provide Investment Fund Manager 112 with an evaluation of Candidate Transaction. As previously described, this is accomplished within the System by the System Transaction Manager 114. An Investment Fund Applicant 110 submits a Candidate Transaction which comprises populating an application as previously described. In order for the System to adequately evaluate the Candidate Transaction, it must be properly populated. The System Transaction Manager 114 transmits the submitted Candidate Transaction application to the System compliance process 116 via link 118. Within System compliance process 116 the application is tested to determine whether one or more pieces of information are incorrect or missing. In that even, System compliance process 116 refuses submittal and returns the application to Investment Fund Applicant 110 via System Transaction Manager 114 through link 120.

If the Candidate Transaction application is complete, System compliance process 116 conveys it to Minimum Prescreen System Criteria 122 via link 124. Within Minimum Prescreen System Criteria 122 the Candidate Transaction is tested against the minimum Investor Criteria for any Managed Investment Fund User in the System. If the Candidate Transaction passes the Minimum Prescreen System Criteria 122, it is a potentially fundable Candidate Transaction under the System and the Candidate Transaction is forwarded to Candidate Transaction evaluation process 126 via link 128. If the Candidate Transaction does not pass the Minimum Prescreen System Criteria 122, it is returned to the Investment Fund Applicant 110 via the System Transaction Manager 114 by means of link 130.

The Investment Fund Applicant 110 can revise the Candidate Transaction information and resubmit it. Within the Candidate Transaction evaluation process 126, the System Transaction Manager 114 applies System/Policy Rules to the Candidate Transaction to determine its ranking among similarly situated Investment Properties. The processed Candidate Transaction is then stored in a pending Candidate Transaction Database 132 for further processing. Within Candidate Transaction Database 132 an accounting process is administered to assure that the Candidate Transaction is not overlapping or redundant with other Candidate Transactions, i.e. the Candidate Transaction does not request funding based on the same or overlapping Investment Properties. In some cases, the redundancy will be exact and in others merely overlapping. These claims are flagged and culled for further processing within the System by the System Administrator.

If the Candidate Transaction is not redundant or overlapping, it is sent to be further evaluated. The Candidate Transaction evaluated and stored in Candidate Transaction Database 132 and is sent to Demographic Information Overlay processing 134 via link 136. Within Demographic Information Overlay processing 134 the geographic locale of the Investment Property is identified and the Demographic Information Overlay processing 134 (stored on the Central Database—not shown) is applied. In this manner, demographic attributes of the locale where the Investment Property is situated, can be used to further evaluate the Candidate Transaction. For example, if real estate values are dropping and unemployment increasing in a particular area where the Investment Property is located, this reduces the probability of the expected return. The Candidate Transaction evaluated within Demographic Information Overlay process 134 is then passed to Investor Criteria evaluation process 138 via link 140. Within Investor Criteria evaluation process 138 the Investor Criteria for each Managed Investment Fund is applied against the Candidate Transaction. In this manner, Candidate Transactions not meeting Investor Criteria for a particular Managed Investment Fund are culled from presentment to the particular Investment Fund Manager.

In accordance with the submittal process of a Candidate Transaction according to the invention a Candidate Transaction can be accepted as submitted or "countered" back to the Investment Fund Applicant. The Investment Fund Applicant can then accept the counter, reject the counter (which terminates the Candidate Transaction), or counter the counteroffer. The process continues until either the Investment Fund Applicant or the Investment Fund Manager finally accepts the Candidate Transaction as amended or if the final amended Candidate Transaction is finally not accepted, it is rejected and dropped from the active System as previously described.

Once a submitted Candidate Transaction (amended or not) is accepted for funding in accordance with its terms, the System generates a participation contract based upon the type of property and the financial aspects of the Candidate Transaction keeping track of the Mortgage Broker commission if any, as well as all aspects of the accepted Candidate Transaction. The accepted Candidate Transaction is a guarantee against a security interest in the Investment Property by the Investment Fund Applicant that the Managed Investment Fund participation as set forth in the accepted Candidate Transaction application will be realized.

Once the participation contract is accepted (it also may be amended), the System opens the Investment Property purchase escrow with an Indexed User, Title/Escrow Entity that is tracked as a System Network Vendor to perform the indicated System generated services with respect to the Candidate Transaction. The Title/Escrow Entity populates a report which is recorded in the Central Database and sent by the System Transaction Manager to the legal review entity Indexed User, which entity is tracked as a System Network Consultant.

Once the initial purchase of Investment Property meets the System's standards as approved by the legal review entity, the purchase is closed through the Title/Escrow Entity with funds being forwarded directly from the participating Managed Investment Fund to the Title/Escrow Entity in accordance with the approved settlement statement. As part of the purchase closing, a deed of trust or other security instrument on the Investment Property is taken in the name of the participating Managed Investment Fund. Advantageously, this security interest is of the accession type which affords a security interest in all after-acquired improvements to the Investment Property.

If the Title/Escrow Entity identifies discrepancies with regard to the Candidate Transaction, which are not waived, accepted, or cured, the Candidate Transaction is terminated in accordance with the terms of the contract with the Investment Fund Applicant. Prior to closing of the Investment Property and additionally after closing of the Investment Property is consummated, and depending on the type of Candidate Transaction, which is primarily determined by the type of property and participation, the System Transaction Manager systematically sends requests to System Network Vendors such as inspection companies, engineering companies, contractors for refurbishment, and the like, which are then submitted to a cadre of System Network Consultants who approve, reject, or modify the System Network Vendor submittals and/or recommendations and approve budgets, draw requests, change orders, and the like.

In one aspect, a System Network Consultant comprises an insurance compliance department which assures that the Candidate Transaction has purchased and applied the appropriate risk insurance for the type of Candidate Transaction funded and advantageously provides for the funding Managed Investment Fund as a co-insured as further security for the participatory funds advanced. It will be realized that funds required to implement the Candidate Transaction are paid directly to System Network Vendors and not to the Real Estate Investor.

In this manner, funds are managed by the System and the System's Administrator directly with the vendor doing the work. Thus, through the online System, various venders are employed to do the tasks in accordance with the Candidate Transaction and consultants, such as appraisers and the like, are independently employed to review and asses compliance all of which is transmitted to the Central Database for storage, routing, and parsing based upon the User ID the Candidate Transaction ID and the Indexing applied by the Transaction Manager. In this manner, the Central Database maintains a complete history of the Candidate Transaction, triggers information in a work flow between Users while blinding certain aspects of the Candidate Transaction to certain Users who do not need the information based upon the Index and trigger request for responses from Users in response to updated information while populating the database with accessible updated information.

In one embodiment, Contractors responsible for refurbishment, as identified by the Investment Fund Applicant, interface the System to bid on the refurbishment costs in a contract between the Real Estate Investor and the Contractor funded by the Managed Investment Fund such that the Managed Investment Fund pays the refurbishment Contractor progress payments directly through the Transaction Manager as the work is completed and certain criteria met, such as county inspection, home owners association approval, and the like. Once refurbishment is completed, re-appraisal is accomplished through a System Network Vendor working directly for the Managed Investment Fund and administered by the System.

In one scenario, the completed Candidate Transaction is placed on the market through, for example, a real estate broker or the like. Upon re-sale, a Title/Escrow Entity, which has online access to the information for the specific Candidate Transaction assigned to that title company, generates a settlement statement reviewed by the investor's consultant/attorney online. The settlement/closing statement, including the Mortgage Broker commission and the percentage of the profit to be paid directly to the Managed Investment fund is generated online for closing. Funds are dispersed to the indicated parties including the Managed Investment Fund directly from the Title/Escrow Entity with the Managed Investment Fund's release of the security interest in the Investment Property.

One skilled in the art will appreciate that the above-described System can be used in various environments other than the Internet. Such alternate communications channels include, but are not limited to, local area network, wide area network, or, as described above, point-to-point dial up connections. Additionally, a ASP may comprise any combination of hardware or software that can offer functionality within the System and/or interface.

The instant invention provides a method and System for populating and managing information from and to an Indexed User. Both, content and protocol are maintained and updated according to System policy (set by the System Administrator) in a Central Database, which can comprise a single or more than one unit in a distributed System. The System Transaction Manager updates an Indexed User, based upon Candidate Transaction information input by System Network Consultants, System Network Vendors, System protocol updates, and System policy as administered by the System Administrator. The Investment Fund Applicant is the primary generating entity, and generates content which are reduced to electronic medium. In another aspect, the protocol is a System's protocol generated on a System basis and parsed to particular Indexed Users.

The Protocols of the instant invention are Systems or ways of internally carrying out transactions with an Indexed User. They can be of a legacy type, employing native application protocol and/or native communications protocol to access the core processes of the System protocol, a type compatible with particular business Systems, or even those utilizing the uniform System protocol. Other known protocols can be used to affect the operation of the System. The inventive System has the ability to be readily integrated with any hardware, any application software (including custom software), or any processing method or device. It has the capability to be used effectively through the Internet, the Intranet, VPN, LAN, WAN, or even wireless transmission. It also has the ability to interface with, for example, Windows, Novell, UNIX, Linux, or MAC OS.

The links between the Indexed User and the System Transaction Manager can be any well known in the art including, for example, cable, direct satellite uplink, cellular broadcast, or the like. In one embodiment, the System employs a VPN in a client/server configuration. In another embodiment, the Internet is used to provide the link between the System Transaction Manager and the individual Users. It will be understood, that a variety of these links can be employed in a single System depending upon convenience, expense, etc. Additionally, a single User can employ more than one link mode in accordance with the invention.

In accordance with an advantageous aspect, the System Transaction Manager acts as a "gateway" to facilitate direct communication between any Indexed User, including the Real Estate Investor and the Fund Manager, including web based providers on the Internet. In accordance with this embodiment, Indexed Users are allowed to interface directly with, for example, Contractor's insurance agents and title companies for a specific Candidate Transaction.

The Central Database incorporates a distributed software application System for capturing, indexing, and storing of information, using a uniform System protocol, wherein, for example, at least one User generates or updates the content of the information to be transferred to another User. The System employs the System Transaction Manager, functioning as a broker or router, between the Users and information generators by way of the Central Database for processing and disseminating the information and/or operating protocol to a specific User either in batch process or, when required, in real time. The System Administrator by way of System policy and prioritizes the information and sets the Index for the User against which incoming content is matched based upon, for example, System Network Vendor identity. The download triggers, as discussed below, are also indicated.

As the System Transaction Manager stores the information on the Central Database, it sets a trigger, such that the next time that Indexed information is to be downloaded to the Indexed User, the System Transaction Manager will download the new information. Once the information is downloaded, the trigger is pulled, indicating that there is nothing new to download to the Indexed User Station on the next requested download. Information lacking complete direction for the System Transaction Manager is cached, as will be further described.

Investment Fund Applicant

In accordance with the instant invention, Investment Fund Applicant is the primary generating entity for providing content for the System to be placed in the Central Database. The content, which is formatted for the System in accordance with its operating protocol, is delivered to the System link or by batched media via electronic link or batched media such as CD disk or the like. The content, appropriately formatted, is then stored in the Central Database for use in accordance with the operation of the System as previously described.

User

A User in accordance with the instant invention is any identified entity which has coded access to the System and provides the input, output, and storage capability compatible with the System. It is Indexed for identity in the System. It will be realized that since data content and protocol for a particular User are site-specific, that sufficient memory must be present to facilitate both content and operating System for the material to be displayed and the transactions to be completed for the particular User. The User has a video display such as CRT, plasma screen, or the like. In some embodiments, the screen also acts as input to the System such as by use of touch screen software. Audio output, such as speakers, where, for example, audio clips such as narrative can be played as well as providing in some instances response to voice activated recognition. Input devices include touch screen keypads and microphones for voice activated or initiated interaction with the content and/or transactions housed or initiated by the User.

The User, in accordance with the instant invention, can employ any work platform conducive to User interaction and able to facilitate various I/O devices such as at least one monitor, a printer, speakers, infrared PDA ports, and the like. Not all Users, which interact with the System of the instant invention, need to be configured identically or have the same capability. As previously described, each User in the System is Indexed such that layered information and/or transaction traffic as selected or facilitated based on the User as implemented by the System Transaction Manager.

In accordance with the instant invention, the User communicates with the Central Information Database through the System Transaction Manager. Each User has a CPU and storage capability so that batched information from the System Central Database can be downloaded to the User in a layered format and the presentation operating System protocol, which is based on the User, can be upgraded and/or changed via the communications link by operation through the System Transaction Manager. The System Transaction Manager becomes aware that the User is online only by means of specific User commands, which require information from the Central Database or the User Station triggers a real time transaction transmitting content or a response or requesting content or a response. In one embodiment, the User commands can be used to request update information from the Central Database by means of accessing the System Transaction Manager wherein the real time information provided is solely an update.

System Administrator

The System Administrator is the control unit that dictates the sequences followed by the System Transaction Manager, as well as monitoring correctness of content format and appropriateness of content with authored protocol for a particular User. In essence, the System Administrator sets up the Network Policy upon which the System operates. It sets System policy so the data can be cached and/or sequenced in an orderly manner in accordance with priorities. In this manner, the System Administrator can set-up sequencing of the System Transaction Manager updates to Indexed Users. When new content is available to be downloaded by the System Transaction Manager, the System Administrator presents a policy to activate a trigger which flags the System Transaction Manager to update Indexed Users from the Central Database at the indicated time or upon request. When the System Transaction Manager receives content, from, for example, a System Network Vendor, the format is checked for compatibility with the System, and the updated information is stored in the Central Database and indexed accordingly. Simultaneously, the trigger is set according to the policy of the System Administrator. The System Transaction Manager updates Indexed User information for the System Network Consultant to receive the updated System Network Vendor content. This is done, for example, at 2:00 A.M. ET each day. At the appropriate update time the System Transaction Manager tests the indexed System Network Vendor content to determine whether a trigger has been set. If so, the System Transaction Manager downloads the updated content to the Indexed User and deactivates the trigger such that if no new System Network Vendor information is present at the next scheduled download, the System Transaction Manager skips the download.

System Transaction Manager

The System Transaction Manager is the facilitator of the System of the instant invention. It populates the Users database, updates System Network Vendor information on the System Network Consultant database, monitors updated System Network Vendor information from a System Network Consultant, sets triggers according to System policy, establishes System's operating protocol, as well as updating protocol to individual Users, responds to System Administrator scheduling, as well as real time demand for updated information from individual Indexed Users and can, if desired, act as a gateway for third party interaction with the System.

The System Transaction Manager must test protocol from System Network Vendor transferring System Network Vendor information to the Central Database and authenticate that the particular System Network Vendor is an Indexed User of the System and acknowledge receipt of the content. In the event System Network Vendor information requires change of individual User protocol, the System Transaction Manager assures the protocol is installed for that User prior to updating the System Network Vendor information to that User. If the policy conditions cannot be met, a flag is set identifying the cached material for System Administrator intervention.

The System Transaction Manager intercepts real time commands and allows hyperlink or patch communication with third party information delivery Systems, if authorized, and monitors the System protocol against the third party protocol to assure compatibility as well as presenting a firewall for the protection of the System. As previously described, the User is Indexed so that the System Transaction Manager can manage data flow, including updating the content for a particular User. The data at the site-specific Indexed User is layered to provide capability for the System Transaction Manager to download index information and/or operations protocol to a particular User based on content criteria as preset in the Index for the specific User.

As is understood by the skilled artisan, the ability to provide an indexing scheme unique to a particular User allows the System Transaction Manager to manage and populate a particular User in a dynamic manner such that triggers are acknowledged by the System Transaction Manager to update information on a pre-set schedule, and as available basis, or in response to a real time user command. The triggers for preset functions are "turned off" after the function is performed.

In accordance with another aspect, direct interface between an Indexed User and the System Transaction Manager allows the System Transaction Manager to respond to real time commands initiated by a User to either provide interconnect links with other Indexed Users to request information not in the Central Database, such as homeowner restrictions in a subdivision. It will be understood by the skilled artisan that operation in this manner allows the flexibility of real time interconnect with the timeliness of updated stored data for the particular Indexed User.

The System Transaction Manager operates the System and manages the content and protocol, as well as populating Indexed Users Systems in accordance with the System Administrator System policy. In accordance with one aspect, the System Transaction Manager converts legacy business protocol to uniform System protocol such as XML, HTTP, and TCP/IP. The System Transaction Manager is advantageously located at the Central Database server. The System Transaction Manager also handles cleanup of errors due to such conditions as network interruptions, equipment failure, unreadable Indexes and the like.

Central Database

The Central Database is preferably maintained on an application server with direct communication link through the System Transaction Manager to System Network Vendor, System Network Consultant, Real Estate Investor, and Investment Fund Manager. The construction of the look-up table is a System dynamic, which is predicated upon System use and ease of access of information by the System Transaction Manager. Once the Central Database is populated, the System Transaction Manager authenticates updates of Indexed User information, which can include both content and protocol. An update of the Central Database causes a trigger to be set by the System Transaction Manager such that the System Transaction Manager will transfer the updated User information to all of those Indexed Users which are Indexed to receive same, in accordance with System Administrator sequence, or upon command from the User in accordance with a pre-set instruction protocol.

Thus, in accordance with the instant invention, each Indexed User is selectively, continually updated with User generated information for which they are Indexed. This update may take place on the Central Database such that as the Indexed User logs onto the System the updated content is presented. Thus, for a particular Candidate Transaction only that User Indexed to receive the specific information can accesses and/or down load information. Thus, Users working on one aspect of a specific Candidate Transaction cannot access or download information for the same Candidate Transaction for which they are not Indexed. The System policy dictates the gateways for Indexed information into a hierarchy from those having greatest access, i.e. the System Administrator, to those Users having the least, such as a Contractor for one Candidate Transaction. If the Central Database information is not updated, the System Transaction Manager will skip the scheduled download as set by the System Administrator. Only when the Central Database contains updated information for particular User is the trigger set in the System Transaction Manager to download on schedule.

Figure 3:
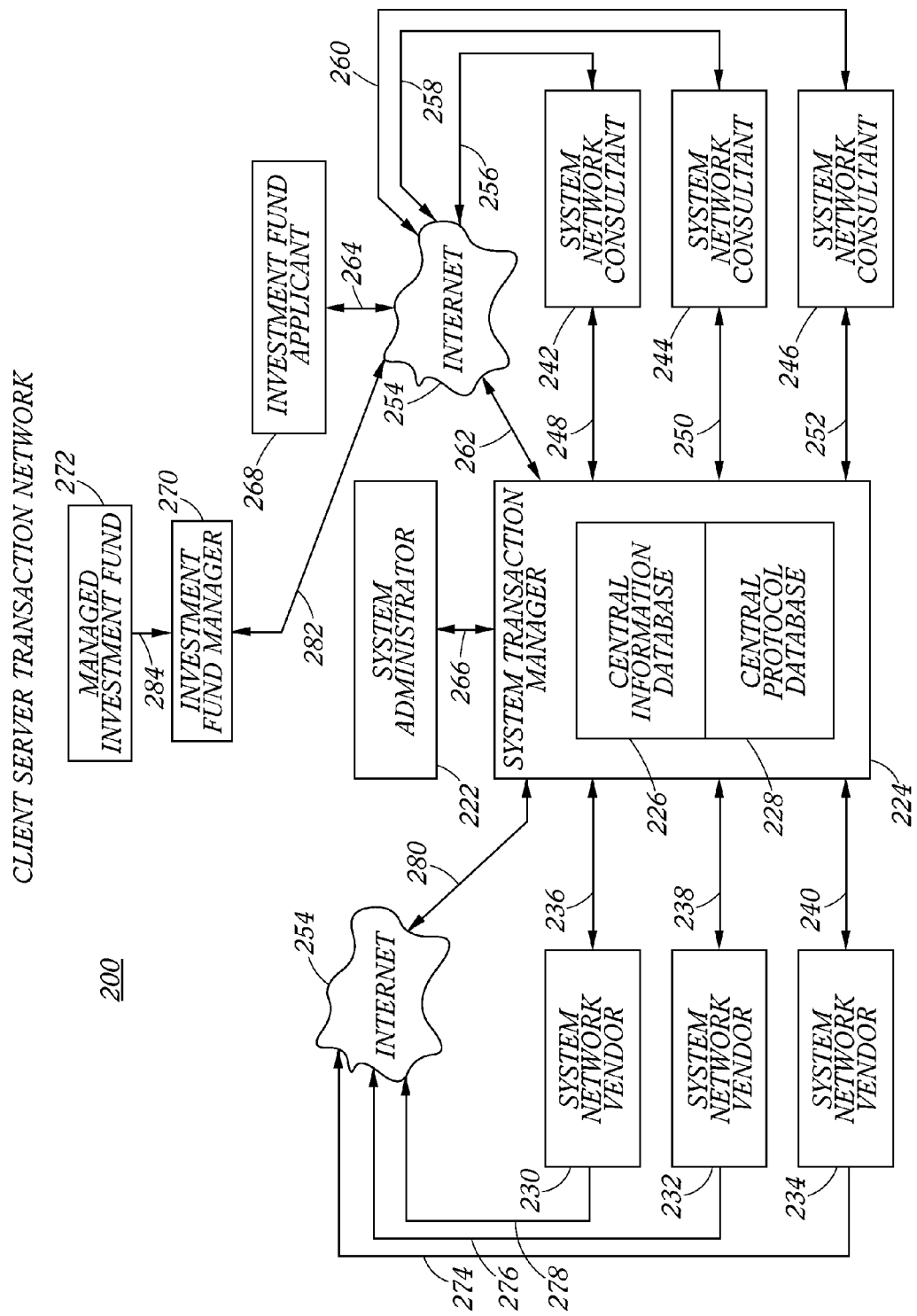
FIG. 3 is a flowchart showing the system transaction module including the information processing and transfer system for a client server network in accordance with the instant invention.

In accordance with the invention, FIG. 3 is exemplary of a "client/server" type System 200 with Internet interface. The client/server System 200 permits "N" System Network Vendors 230, 232, and 234 to link with System Transaction Manager 224. The designation of "N" System Network Vendors illustrates that any number of System Network Vendors could be connected to the client/server System 200 of the instant invention. The System Transaction Manager 224 is, for example, computer microprocessor-based equipment residing at one or at multiple locations and is set up to communicate with the "N" System Network Consultants 242, 244, and 246 for the required electronic communication. The System Transaction Manager 224 includes a Central Information Database 226 and a Central Protocol Database 228. Communications links 236, 238, and 240 functionally connect the System Network Vendors 230, 232, and 234, respectively, to the System Transaction Manager 224 by, for example, dial-up networking, Digital Subscriber Lines ("DSL"), Asymmetric Digital Subscriber Lines ("ADSL"), Virtual Private Network ("VPN"), cable, wireless technology such as IR, radio frequency, cell, and satellite, or any other high speed connection as made available by technological advances in communication Systems and as practiced by those skilled in the relevant arts.

A System Administrator 222 sets client/server System 200 policy and interfaces with the System Transaction Manager 224 through link 266. System Network Consultants 242, 244, and 246 communicate with the System Transaction Manager 224 via communications links 248, 250, and 252 respectively as well as through the Internet 254 by means of Internet communication links 256, 258, and 260 respectively. Internet 254 likewise communicates with the System Transaction Manager 224 by means of Internet connection 262.

The System Transaction Manager 224 operates the data flow in client/server System 200, in accordance with policy, as set by the System Administrator 222. Information data within Central Information Database 226 is indexed to provide System Transaction Manager 224 instructions for populating and managing information data to and from Indexed System Network Consultants 242, 244, and 246 via communication links 248, 250, and 252. Central Protocol Database 228 contains System protocol, as previously described, which may comprise operating protocol for the System as well as individual User protocol, which is associated with Indexed information data contained in the Central Information Database 226.

Thus, the System Transaction Manager 224, in accordance with the Indexed data, initially interfaces System Network Consultants 242, 244, and 246 with layered, Candidate Transaction specific data, which is directed by means of the Index. Along with the information data population, System Transaction Manager 224 downloads appropriate System protocol, again based on Indexing, to render Indexed System Network Consultants 242, 244, and 246 interactively operative. The protocol is authored to perform a myriad of functions for each Indexed User (System Network Consultants and System Network Vendors), such as User/User interface, communication protocol, audio/video display protocol, and the like.

System Network Vendors 230, 232, and 234 generate content for the client/server System 200. The System Network Vendor can be local to the Investment Property or national. Content is generated in a form, as previously described, and transmitted via data links 236, 238, and 240 to the System Transaction Manager 224. In some cases protocol, usually display protocol, is transferred with the content to allow all Users to interface with System Network Vendor content. This is especially true when the content requires a particular formatting and/or set of operations to adequately present the information from the System Network Vendor to the Indexed User. The System Transaction Manager 224, with appropriate data identification, prioritizes the information in accordance with the policy set by System Administrator 222 for storage, indexing and then caches the information generated by the System Network Vendor. In addition, as previously described, a trigger is set indicating that the information is new. The System Transaction Manager 224 then tests the cache of information to determine the dissemination requirements.

If the protocol accompanies the content, the protocol is stripped and Indexed for storage in the central protocol database with an appropriate associating trigger such that the protocol update is transmitted to the Indexed User prior to the content.

In one embodiment, using System software installed "on-site" at the Indexed System Network Consultants 242, 244, and 246 and configured as dial-up, System Network Consultants 242, 244, and 246 automatically access the System Transaction Manager 224 via communications links 248, 250, and 252 respectively to update information.

As shown in FIG. 3, the client/server System 200 provides access to Investment Fund Applicant 268 via the Internet 254. Internet 254 is linked to System Network Consultants 242, System Network Consultants 244, and System Network Consultants 246 by means of links 256, 258, and 260 respectively. Internet 254 is linked to System Network Vendors 230, System Network Vendors 232, and System Network Vendors 234 by means of links 278, 276, and 274 respectively. System Transaction Manager 224 is also connected to the Internet 254 via links 262 and 280. The Investment Fund Applicant 268 is likewise connected via link 264. In addition to the links 248, 250, and 252, links are also provided through the Internet 254, as described, such that System Transaction Manager 224 provides either a gateway to Internet 254 via link 262 or allows monitored direct access of System Network Consultants 242, 244, and 246 to the Internet 254. The client/server System 200 provides access to the Investment Fund Manager 270 via the Internet 254. The Investment Fund Manager 270 is connected via link 282 and Managed Investment Fund 272 is connected via link 284.

In accordance with this aspect, functionality of System Network Consultants 242, 244, and 246 can include direct interaction with Investment Fund Applicant 268 through Internet 254. In operation, a System Network Vendor can display information through Internet 254. It will be realized that, in accordance with this embodiment, the System Transaction Manager 224 has control over Internet access of all Indexed Users.

The Normalized Data Format used by the present invention can be any well-known data formatting protocol. For example, the Normalized Data Format can be the eXtended markup language (XML). Alternatively, for the Systems of the present invention that link together the constituent Users over the Internet, the Normalized Data Format can be FTP, TCP/IP, or http standard used on the Internet.

In one aspect, the communications link is a private secure link. In accordance with another aspect, the communications link is a pre-existing, public System such as the Internet. In accordance with an advantageous embodiment contemplated herein, a single centralized System Transaction Manager is provided. In another embodiment, a plurality of System Transaction Managers communicates with the Indexed System Network Consultants and in turn with a central System Transaction Manager in a multi-tiered System.

System Network Vendor

In accordance with the instant invention, there are a number of third parties who interact with the transactional phase of the System. These third parties can be in the form of independent agents, appraisals, such as real estate appraisals, engineering and inspection companies, title agents, and the like. In accordance with the invention as set forth above, these third party vendors have direct access to the Central Database for a particular property or transaction as previously described. The central protocol database in conjunction with the System Transaction Manager shepherds the information from these third party vendors to the appropriate position within the Central Information Database such that all entities having password access for a particular property or transaction can access uploaded information from specific third party vendors.

In order to assure the authenticity of third party vendor information, advantageously the System provides for upload review. For example, the title search maybe reviewed by the management program attorney, who also has responsibility for funding applications, contracts, escrow arrangements, and the like, as previously described. The level and scrutiny required in respect to the upload review can be determined by the administrator predicted upon the trustworthiness of the third party vendor. In some cases only a cursory review is required; in other cases, a detailed assessment of uploaded information is needed.

Real Estate Investor

The Real Estate Investor, in accordance with the instant invention, is the party that finds and presents by way of funding application, the real estate transactions to be evaluated and, if accepted, consummated to termination. It will be realized that the instant System is applicable to various types of real estate transactions including but not limited to re-sales, rehabs, fix-ups, developer portfolios, builders, and the like. The Real Estate Investor may be an individual, a legal entity, such as a corporation or LLC, an association or an affiliation. The sole requisite is that the Real Estate Investor must be able to take title to the property and provide fund with a lien dead of trust or other real estate security document capable of being foreclosed upon default.

As set forth above, advantageously, Real Estate Investors are part of a localized network which particularly in re-sale transactions are directed to the System through a preferred or cooperating Mortgage Broker network. In this manner, the System Administrator relies on the Mortgage Broker network for calling and prescreening of bonafide and trustworthy Real Estate Investors. In one aspect, the Mortgage Broker can actually issue a Real Estate Investor with a password allowing the Real Estate Investor to fill out an online application. In this aspect, the Mortgage Broker and the Real Estate Investor usually entering into a commission contract which maybe part of the System. In either event, the particulars and/or terms of the commission agreement are tracked by the System and advantageously the commission is paid directly to the Mortgage Broker from the Real Estate Investor's proceeds at settlement.

Broker Network

The Mortgage Broker network comprises a preferred broker network and cooperating broker network. The preferred broker network is approved by the System Administrator to prescreen Real Estate Investors who become Investment Fund Applicants. The cooperating broker network is associated with the preferred broker and provides Real Estate Investor Candidates to the preferred broker for approval. In this manner, according to the invention, the System is able to take advantage of these broker networks to prescreen Real Estate Investors.

Investment Fund Applicant

Upon initial approval of the Investment Fund Applicant, the Investment Fund Applicant submits a Candidate Transaction which comprises populating a set of drop-down menus which ultimately will be transferred to the Information Database and assigned a transaction ID. It will be appreciated that population of this application including identification of the Participatory Real Estate Transaction including the Investment Property will trigger the remainder of the System. The initial criteria for evaluation and populating downstream aspects of the System interface are identification of the type of transaction. Specifically, the type of property to be funded is first identified and broken into, for example, industrial, residential, and/or commercial. Industrial properties are then further broken down into, for example, manufacturing, warehouse/distribution, shipping depot, and the like.

Commercial properties can likewise be broken down into, for example, office building, retail outlet, shopping center, mini-storage, and the like. Residential properties can be broken down into, for example, single family dwellings, duplexes, townhouses, patio homes, and apartment complexes.

Once the Investment Fund Applicant has selected the type of property for the particular Participatory Real Estate Transaction, the System generates the appropriate criteria against which this transaction is judged for funding. The Investment Fund Applicant then populates the remainder of the application to structure the financial part of the application. This basically is a structure of the "deal" proposed between the Managed Investment Fund and the Real Estate Investor. Criteria such as apprised value, total value of the Participatory Real Estate Transaction, the terms of participation, the cost of construction, and the like, are populated predicated upon the property type initially chosen.

Minimum Prescreen System Criteria

Once the Investment Fund Applicant has populated the application specifying the type of transaction and the financial aspects of the deal, the System overlays the Minimum Prescreen System Criteria which comprises online criteria to evaluate the acceptability of the submitted Participatory Real Estate Transaction. If the Minimum Prescreen System Criteria are not met, the System Transaction Manager will not allow the "SEND" button be activated and the Investment Fund Applicant is not able to submit the Candidate Transaction. The Investment Fund Applicant then may alter the terms of his Candidate Transaction to, for example, decrease the amount of funds requested and/or increase the percentage of the participation of the Managed Investment Fund, or the like. Only when the Candidate Transaction meets the Minimum Prescreen System Criteria, will the System Transaction Manager allow the Candidate Transaction to be stored in the Central Information Database and Index with transaction ID. In this manner, an initial threshold evaluation is performed by the System.

Demographic Information Overlay

Once the Candidate Transaction has been accepted and stored in the Information Database, the System Transaction Manager overlays the demographic information matched against the type of transaction and the physical location of the Investment Property. The Demographic Overlay can comprise various economic and demographic factors peculiar or particular to a specific geographic region. For example, unemployment rate, mean time to sale of the type of Investment Property, population ingress and egress, mean average income, and the like. In this manner, a Candidate Transaction can be ranked against similar Candidate Transactions and rated for investment purposes and/or can be assessed against Investment Criteria.

One skilled in the art will appreciate that the above-described System can be used in various environments other than the Internet. Such alternate communications channels include, but are not limited to, local area network, wide area network, or, as described above, point-to-point dial up connections. Additionally, a User Station may comprise any combination of hardware or software that can offer functionality within the System and/or interface with third party service/goods provider.

All of the methods and Systems disclosed and claimed herein can be made and executed without undue experimentation in light of the present disclosure. While the methods and Systems of this invention have been described in terms of embodiments, it will be apparent to those of skill in the art that variations may be applied to the methods and Systems and in the steps or in the sequence of steps of the methods described herein without departing from the concept, spirit and scope of the invention. Various substitutions can be made to the hardware and software Systems described without departing from the spirit of the invention. All such similar substitutes and modifications apparent to those skilled in the art are deemed to be within the spirit, scope, and concept of the invention as defined by the appended claims.

What is claimed is:

1. A system for evaluating, funding, and completing a participatory real estate transaction comprising:
   a. a central database comprising a central information database;
   b. at least one managed investment fund for funding a participatory real estate transaction based upon at least one investor criteria wherein the investor criteria is retained on the central information database;
   c. at least one candidate transaction related to a specific investment property submitted by an investment fund applicant for participatory funding retained on the central information database;
   d. a system transaction manager, comprising computer microprocessor based equipment residing at one or multiple locations, configured by a system administrator to communicate with the central information database to:
      (i) enter into relationships with the at least one managed investment fund to fund participatory real estate transactions that meet investor criteria;
      (ii) apply system/policy rules to the submitted candidate transaction to determine its ranking among similarly situated investment properties;
      (iii) direct a fund manager to evaluate submitted candidate transactions against investor criteria;
      (iv) designate the eligible candidate transaction in the central database for qualified funding, including directing a title/escrow entity to establish an escrow to receive funds upon completion of the participatory real estate transaction;
      (v) purchase an investment property and assure the managed investment fund receives a security interest in the investment property;
      (vi) direct at least one system network consultant to oversee, evaluate, and approve candidate transactions as they move through the system;
      (vii) fund at least one system network vendor, including a contractor\builder, to provide indicated real estate based services for the candidate transactions;
      (viii) designate a title/escrow entity to generate a settlement/closing statement for the completed candidate transaction;
      (ix) release the security interest and parse the participatory shares of the proceeds of the secured participatory real estate transactions between the managed investment fund and the investment fund applicant upon completion of the secured participatory real estate transaction.

2. The method of claim 1 wherein the evaluation of the candidate transaction includes evaluation against a demographic information overlay specific to the locale of the investment property and the ranking of the candidate transaction.

3. The system of claim 1 wherein the at least one system network vendor is selected from a group comprising appraisers, escrow agents, title agents, inspection companies, real estate agents, and combinations thereof.

4. The system of claim 1 wherein the at least one system network consultant is selected from a group consisting essentially of lawyers, insurance compliance agents, risk managers, construction consultants, and combinations thereof.

5. The system of claim 1 wherein the at least one builder/contractor is in privity with the investment fund applicant for affecting real estate based improvements to the investment property and is overseen by the system network consultant.

6. The system of claim 1 wherein said investment fund applicant is a real estate investor that has been pre-screened by a mortgage broker.

7. The system of claim 1 wherein the candidate transaction is selected from a group consisting of rehab or refurbishment, real estate repositioning transactions, large scale, new, real estate based residential, commercial, and industrial developments such as malls, office complexes, apartment complexes, warehouses, manufacturing facilities, and combinations thereof.

8. A computer based method for evaluating, funding, and completing secured participatory real estate transactions comprising the steps of:
   a. creating at least one managed investment fund having investment funds from at least one fund investor that are restricted by at least one investor criteria which is entered into a central information database;
   b. inputting a candidate transaction related to a specific investment property by an investment fund applicant into the central information database;
   c. configuring a system transaction manager through a system administrator that sets system policy such that the system transaction manager communicates with the central information database, wherein the system transaction manager is computer micro-processor based equipment residing at one or multiple locations;
   d. qualifying at least one candidate transaction for funding from the managed investment fund which is in compliance with the system criteria and at least one investor criteria;
   e. applying system/policy rules to the submitted candidate transaction to determine its ranking among similarly situated investment properties by the system transaction manager;
   f. designating the eligible candidate transaction in the central database for qualified funding by the system transaction manager, including directing a title/escrow entity to establish an escrow to receive funds upon completion of the participatory real estate transaction;
   g. purchasing of the investment property with qualified funds from the managed investment funds through the system transaction manager and taking a security interest in the investment property;
   h. engaging at least one system network vendor through the system administrator, including at least one builder/contractor to provide indicated real estate based services for the candidate transaction;
   i. reviewing the indicated real estate based services for the candidate transaction by at least one system network consultant through the system transaction manager for storage in the central database;

j. approving the completion of the indicated real estate based services for the candidate transaction by the system network consultant through the system transaction manager for storage in the central database;

k. paying the at least one system network vendor with designated managed investment funds through the system transaction manager of the approved real estate based services for the candidate transaction;

l. generating a settlement/closing statement for the completed candidate transaction by a title/escrow entity; and, m. dispersing funds and releasing the security interest in the investment property in accordance with the settlement/closing statement generated by the title/escrow entity through the system transaction manager to the managed investment fund and the investment fund applicant to complete the secured participatory real estate transaction.

9. The method of claim 8 wherein qualifying of the candidate transaction includes evaluating against a demographic information overlay specific to the locale of the investment property to rank the candidate transaction.

10. The method of claim 8 wherein the system network vendors are selected from a group comprising appraisers, escrow agents, title agents, inspection companies, real estate agents, and combinations thereof.

11. The method of claim 8 wherein the system network consultants are selected from a group consisting essentially of lawyers, insurance compliance agents, risk managers, construction consultants, and combinations thereof.

12. The method of claim 8 wherein the contractor, as a system network vendor, is in privity with the investment fund applicant for affecting improvements to the investment property, and is overseen by a construction consultant function and paid through the system administrator.

13. The method of claim 8 wherein said investment fund applicant is a real estate investor that is pre-screened by a mortgage broker.

14. The method of claim 8 wherein the candidate transaction is selected from a group consisting of rehab or refurbishment real estate repositioning transactions, large scale, new, real estate based residential, commercial, and industrial developments such as malls, office complexes, apartment complexes, warehouses, manufacturing facilities, and combinations thereof.

* * * * *